United States Patent
Zheng et al.

(10) Patent No.: US 10,374,716 B2
(45) Date of Patent: Aug. 6, 2019

(54) DIGITAL OPTICAL MODULATOR FOR PROGRAMMABLE N-QUADRATURE AMPLITUDE MODULATION GENERATION

(71) Applicant: Futurewei Technologies, Inc., Plano, TX (US)

(72) Inventors: Xueyan Zheng, Andover, MA (US); Dawei Zheng, Irvine, CA (US); Xiao Shen, San Bruno, CA (US); Morgan Chen, San Jose, CA (US); Hongbing Lei, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/389,069

(22) Filed: Dec. 22, 2016

(65) Prior Publication Data

US 2017/0104541 A1    Apr. 13, 2017

Related U.S. Application Data

(63) Continuation of application No. 14/075,882, filed on Nov. 8, 2013, now Pat. No. 9,531,478.

(51) Int. Cl.
*G02F 1/03*        (2006.01)
*G02F 1/035*       (2006.01)
(Continued)

(52) U.S. Cl.
CPC ......... *H04B 10/40* (2013.01); *H04B 10/2575* (2013.01); *H04B 10/5161* (2013.01);
(Continued)

(58) Field of Classification Search
CPC ...... G02B 6/4246; G02B 6/12; H04B 10/541; H04B 10/2575; H04B 10/40;
(Continued)

(56) References Cited

U.S. PATENT DOCUMENTS 5,945,885 A    8/1999   Schwartz et al.
6,535,316 B1   3/2003   Mizuhara
(Continued)

FOREIGN PATENT DOCUMENTS

CN      1408167 A      4/2003
CN    101300758 A     11/2008
(Continued)

OTHER PUBLICATIONS

Machine Translation and Abstract of Chinese Publication No. CN102088317, Jun. 8, 2011, 14 pages.
(Continued)

*Primary Examiner* — Abbas H Alagheband
(74) *Attorney, Agent, or Firm* — Conley Rose, P.C.

(57) ABSTRACT

An optical transceiver comprising an optical signal input, a first modulation section coupled to the optical signal input, a second modulation section coupled to the optical signal input and positioned in serial with the first modulation section, wherein the first modulation section comprises a first digital electrical signal input, a first digital driver coupled to the first digital electrical signal input, and a first modulator coupled to the first digital driver, and wherein the second modulation section comprises a second digital electrical signal input, a second digital driver coupled to the second digital electrical signal input, and a second modulator coupled to the second digital driver, and an optical signal output coupled to the first modulation section and the second modulation section.

20 Claims, 10 Drawing Sheets

(51) Int. Cl.
  *H04B 10/40* (2013.01)
  *H04B 10/54* (2013.01)
  *H04L 27/00* (2006.01)
  *H04L 27/34* (2006.01)
  *H04L 27/36* (2006.01)
  *H04B 10/516* (2013.01)
  *H04B 10/556* (2013.01)
  *H04B 10/2575* (2013.01)

(52) U.S. Cl.
  CPC ....... *H04B 10/541* (2013.01); *H04L 27/0008* (2013.01); *H04L 27/3411* (2013.01); *H04L 27/36* (2013.01); *H04L 27/361* (2013.01); *H04L 27/362* (2013.01); *H04L 27/365* (2013.01); *G02F 1/035* (2013.01); *G02F 1/0327* (2013.01); *H04B 10/556* (2013.01)

(58) Field of Classification Search
  CPC ...... H04B 10/556; H04B 10/00; H04B 10/04; H04B 10/516; H04L 27/0008; H04L 27/3411; H04L 27/36; G02F 1/035; G02F 1/0327; G02F 1/01; H04J 14/08
  USPC .... 398/135, 183, 159, 182, 188; 385/3, 183, 385/14
  See application file for complete search history.

(56) References Cited

U.S. PATENT DOCUMENTS

| | | | | |
|---|---|---|---|---|
| 7,292,792 | B2* | 11/2007 | Chen | H04B 10/506 398/102 |
| 7,483,597 | B2* | 1/2009 | Shastri | G02F 1/0123 359/237 |
| 7,826,752 | B1* | 11/2010 | Zanoni | H04B 10/5055 398/186 |
| 8,320,720 | B2* | 11/2012 | Webster | G02F 1/0121 385/14 |
| 8,442,361 | B1* | 5/2013 | Wang | G02F 1/2255 385/2 |
| 8,717,080 | B2* | 5/2014 | Ferguson | H03K 5/133 327/261 |
| 8,797,198 | B2* | 8/2014 | Ehrlichman | G02F 1/0121 341/137 |
| 8,869,012 | B2* | 10/2014 | Murakami | H04L 1/22 375/260 |
| 9,031,417 | B2* | 5/2015 | Ehrlichman | G02F 1/0121 398/186 |
| 9,391,710 | B2* | 7/2016 | Satoh | H04B 10/516 |
| 9,454,059 | B1* | 9/2016 | Nagarajan | H04B 10/25 |
| 9,746,698 | B2* | 8/2017 | Goodwill | G02F 1/011 |
| 2003/0076897 | A1 | 4/2003 | Dirr | |
| 2003/0170035 | A1* | 9/2003 | Kisaka | H04J 14/08 398/183 |
| 2003/0185311 | A1* | 10/2003 | Kim | H04L 27/2608 375/260 |
| 2004/0052442 | A1* | 3/2004 | Li | B82Y 20/00 385/3 |
| 2005/0175281 | A1 | 8/2005 | Thapliya et al. | |
| 2005/0238367 | A1* | 10/2005 | Chen | H04B 10/505 398/188 |
| 2006/0034616 | A1* | 2/2006 | Tipper | G02F 1/0123 398/186 |
| 2008/0095486 | A1* | 4/2008 | Shastri | G02F 1/0123 385/3 |
| 2008/0240726 | A1* | 10/2008 | Wang | H04B 10/505 398/141 |
| 2009/0169213 | A1 | 7/2009 | Lowery et al. | |
| 2009/0220239 | A1 | 9/2009 | Armstrong et al. | |
| 2009/0324247 | A1* | 12/2009 | Kikuchi | G02F 1/225 398/159 |
| 2009/0324253 | A1* | 12/2009 | Winzer | H04B 10/505 398/185 |
| 2010/0085098 | A1* | 4/2010 | Ferguson | H03K 5/133 327/264 |
| 2010/0156679 | A1* | 6/2010 | Ehrlichman | G02F 1/0121 341/50 |
| 2010/0183060 | A1* | 7/2010 | Lee | H04L 7/042 375/222 |
| 2010/0322348 | A1* | 12/2010 | Tomezak | H04L 25/022 375/298 |
| 2011/0044573 | A1* | 2/2011 | Webster | G02F 1/0121 385/3 |
| 2011/0075713 | A1* | 3/2011 | Lovberg | H04L 27/2039 375/219 |
| 2011/0091221 | A1* | 4/2011 | De Gabory | H04B 10/505 398/188 |
| 2011/0122932 | A1* | 5/2011 | Lovberg | H04L 27/2039 375/219 |
| 2011/0135242 | A1* | 6/2011 | Prosyk | G02F 1/225 385/3 |
| 2012/0219282 | A1* | 8/2012 | Koganei | H04J 3/1652 398/1 |
| 2012/0230626 | A1* | 9/2012 | Metz | G02F 1/011 385/3 |
| 2012/0251032 | A1* | 10/2012 | Kato | G02F 1/0327 385/3 |
| 2012/0251119 | A1 | 10/2012 | McNicol et al. | |
| 2012/0320442 | A1* | 12/2012 | Gabory | H04L 25/4904 359/238 |
| 2013/0108276 | A1* | 5/2013 | Kikuchi | H04B 10/677 398/158 |
| 2013/0170841 | A1 | 7/2013 | Liu et al. | |
| 2014/0233962 | A1* | 8/2014 | Kato | G02F 1/025 398/183 |
| 2014/0241659 | A1* | 8/2014 | Fukuda | G02F 1/0121 385/3 |
| 2014/0294402 | A1* | 10/2014 | Ito | H04B 10/5561 398/188 |
| 2014/0355926 | A1* | 12/2014 | Velthaus | G02F 1/2255 385/3 |
| 2016/0218811 | A1* | 7/2016 | Chen | H04B 10/5561 |
| 2016/0373190 | A1* | 12/2016 | Reimer | H04B 10/2507 |
| 2017/0104541 | A1 | 4/2017 | Zheng et al. | |

FOREIGN PATENT DOCUMENTS

| | | |
|---|---|---|
| CN | 101310458 A | 11/2008 |
| CN | 102088317 A | 6/2011 |
| CN | 102971976 A | 3/2013 |
| CN | 101964683 B | 5/2013 |
| CN | 103124208 A | 5/2013 |
| EP | 2645609 A1 | 10/2013 |

OTHER PUBLICATIONS

Wu, X., et al., "A 20Gb/s NRZ/PAM-4 1V Transmitter in 40nm CMOS Driving a Si-Photonic Modulator in 0.13 µm CMOS," XP032350504, Feb. 17, 2013, 3 pages.
Seimetz, M., "High-Order Modulation for Optical Fiber Transmission," XP055310365, Transmitter Design, Jun. 24, 2009, 44 pages.
Kato, T., et al., "10-Gb/s—80-km operation of full C-band InP MZ modulator with linear-accelerator-type tiny in-line centipede electrode structure directly driven by logic IC of 90-nm CMOS process," Optical Fiber Communication Conference, 2011, 3 pages.
Peng, W., et al., "DAC-free Generation and 320-km Transmission of 11.2-GBd PDM-64QAM Using a Single I/Q Modulator," Technical Digest, 2012, 3 pages.
Sakamoto, T., et al., "High-bit-rate optical QAM," OSA/OFC/NFOEC, Mar. 22, 2009, 3 pages.
Foreign Communication From a Counterpart Application, European Application No. 14860671.8, Extended European Search Report dated Jan. 25, 2017, 12 pages.
Foreign Communication From a Counterpart Application, European Application No. 14860671.8, Partial Supplementary European Search Report dated Oct. 21, 2016, 7 pages.
Foreign Communication From a Counterpart Application, Chinese Application No. 201480058959.9, Chinese Search Report dated Jun. 6, 2017, 3 pages.

(56) References Cited

OTHER PUBLICATIONS

Foreign Communication From a Counterpart Application, Chinese Application No. 201480058959.9, Chinese Office Action dated Jun. 19, 2017, 6 pages.
Foreign Communication From a Counterpart Application, PCT Application No. PCT/CN2014/090532, International Search Report dated Jan. 28, 2015, 7 pages.
Foreign Communication From a Counterpart Application, PCT Application No. PCT/CN2014/090532, Written Opinion dated Jan. 28, 2015, 5 pages.
Office Action dated Jul. 23, 2015, 24 pages, U.S. Appl. No. 14/075,882, filed Nov. 8, 2013.
Office Action dated May 17, 2016, 23 pages, U.S. Appl. No. 14/075,882, filed Nov. 8, 2013.
Office Action dated Aug. 5, 2016, 8 pages, U.S. Appl. No. 14/075,882, filed Nov. 8, 2013.
Notice of Allowance dated Sep. 12, 2016, 8 pages, U.S. Appl. No. 14/075,882, filed Nov. 8, 2013.
Shastri, A., et al, "Ultra-Low-Power Single-Polarization QAM-16 Generation Without DAC Using a CMOS Photonics Based Segmented Modulator," Journal of Lightwave Technology, vol. 33, No. 6, Mar. 15, 2015, pp. 1255-1260.

\* cited by examiner

| Bias at null point | | | State | φ | Electrical field |
|---|---|---|---|---|---|
| D0 | D1 | D2 | | | |
| -1 | -1 | -1 | -3 | 0 | 2 |
| -1 | -1 | 1 | -1 | π/3 | 1 |
| -1 | 1 | 1 | 1 | 2*π/3 | -1 |
| 1 | 1 | 1 | 3 | π | -2 |

FIG. 6

| Bias at Null Point | | | State | Phase (φ) | Electrical Field |
|---|---|---|---|---|---|
| D0 | D1 | D2 | D3 | | | |
| -1 | -1 | -1 | -1 | -4 | 0 | 4 |
| -1 | -1 | -1 | 1 | -2 | π/4 | 2.83 |
| -1 | -1 | 1 | 1 | 0, bias point | π/2 | 0 |
| -1 | 1 | 1 | 1 | 2 | 3*π/4 | -2.83 |
| 1 | 1 | 1 | 1 | 4 | π | -4 |

FIG. 8

| Bias at null point | | State | φ | Electrical field |
|---|---|---|---|---|
| D0 | D1 | | | |
| -1 | -2 | -3 | 0 | 2 |
| 1 | -2 | -1 | π/3 | 1 |
| -1 | 2 | 1 | 2*π/3 | -1 |
| 1 | 2 | 3 | π | -2 |

FIG. 10

DIGITAL OPTICAL MODULATOR FOR PROGRAMMABLE N-QUADRATURE AMPLITUDE MODULATION GENERATION

CROSS-REFERENCE TO RELATED APPLICATIONS

This patent application is a continuation of co-pending U.S. patent application Ser. No. 14/075,882, filed Nov. 8, 2013, by Zheng, et al., and entitled "Digital Optical Modulator for Programmable n-Quadrature Amplitude Modulation Generation," the teachings and disclosure of which are hereby incorporated in their entireties by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Quadrature amplitude modulation (QAM) is a modulation scheme that conveys two signals by modulating the amplitudes of two carrier waves. The carrier waves, which are generally sinusoids, are known as quadrature carriers because they are out of phase with each other by 90 degrees. The modulate waves are then summed and transmitted to a destination. QAM is used extensively in the telecommunications field, and is increasingly being used in optical fiber systems.

SUMMARY

In one embodiment, the disclosure includes an apparatus comprising a digital electrical signal input, an optical signal input, a digital driver coupled to the digital electrical signal input, and a modulator coupled to the optical signal input and the digital driver, wherein there is no digital-to-analog converter positioned between the digital electrical signal input and the modulator.

In another embodiment, the disclosure includes an optical transceiver comprising an optical signal input, a first modulation section coupled to the optical signal input, a second modulation segment coupled to the optical signal input and positioned in parallel with the first modulation section, wherein the first modulation section comprises a first digital electrical signal input, a first digital driver coupled to the first digital electrical signal input, and a first modulator coupled to the first digital driver, and wherein the second modulation section comprises a second digital electrical signal input, a second digital driver coupled to the second digital electrical signal input, and a second modulator coupled to the second digital driver, and an optical signal output coupled to the first modulation section and the second modulation section.

In yet another embodiment, the disclosure includes a method comprising receiving an optical signal, and modulating the optical signal using a digital electrical signal from a digital electrical signal processor, wherein the digital electrical signal is not converted to an analog signal prior to being used to modulate the optical signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a table presenting electrical field values for 16 QAM generation using three sections according to an embodiment of this disclosure.

FIG. 8 is a table presenting electrical field values for an embodiment of a transceiver that may be utilized for nQAM generation.

FIG. 10 is a table presenting electrical field values for 16 QAM generation using two unequal sections according to an embodiment of this disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A recent trend in optical electronics has been the increasing use of coherent technology in 40 Gigabit-per-second (Gb/s) and 100 Gb/s and/or faster systems. However, high power consumption and high cost associated with various key optical electronic parts, e.g. high-speed analog-to-digital (ADC) and/or digital-to-analog (DAC) convertors, optical modulators, and linear radio frequency (RF) drivers, may be impeding the implementation of components such as transceivers in coherent form. Accordingly, a low power modulator suitable for use in optical electronics systems may be desirable.

Disclosed herein is a system for the generation of a plurality of electrical signal modulation formats using less complex hardware than prior art designs. The system may employ a segmented phase modulator, which may utilize one or more digital drivers to facilitate the generation of the plurality of modulation formats, e.g. non-return-to-zero (NRZ) and/or n-quadrature amplitude modulation (nQAM) where n is an integer indicating the level or degree of modulation. The system may also facilitate the modulation of optical signals without the need for a linear driver and/or without the need for a DAC at the output of an application specific integrated circuit (ASIC) generating a signal for controlling the modulation. Thus, the disclosed system may reduce the power dissipation and cost conventionally associated with optical modulation.

Figure 1:
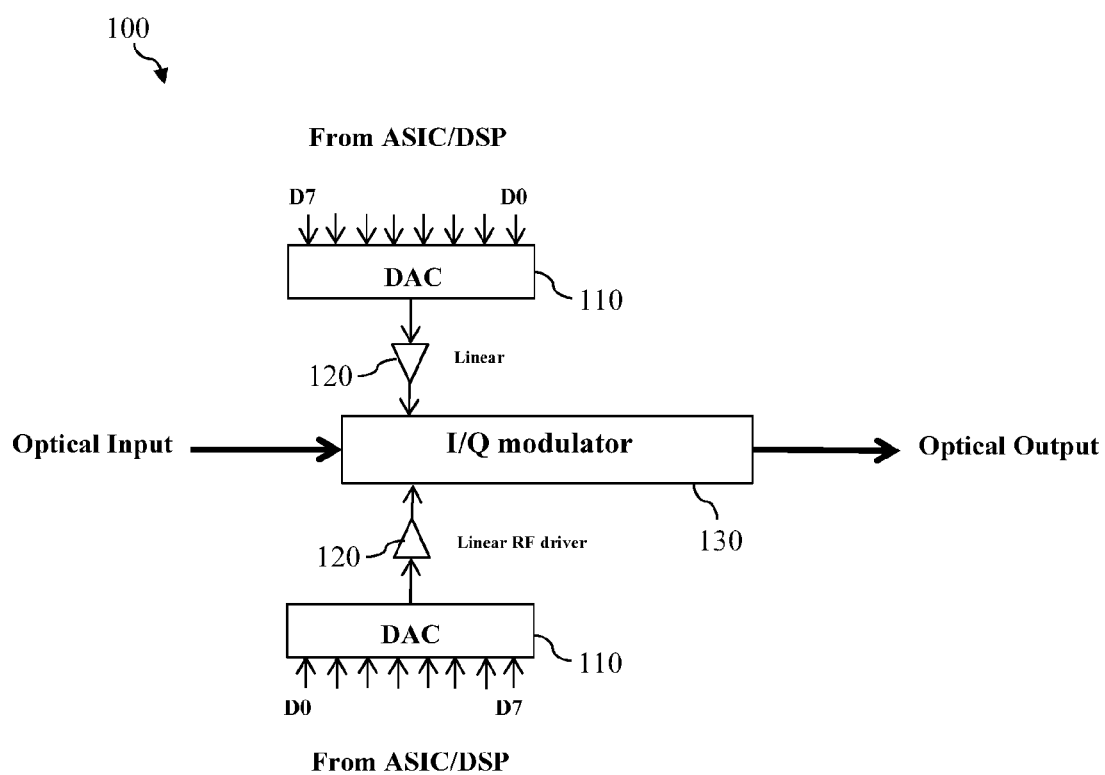
FIG. 1 is a schematic diagram of an embodiment of an apparatus that may be utilized for nQAM generation.

FIG. 1 is a schematic diagram of an embodiment of an apparatus 100 that may be utilized for nQAM generation. Apparatus 100 may include one or more DACs 110 (e.g. located inside an ASIC) coupled to one or more linear RF drivers 120, coupled to an I/Q modulator 130. The I/Q modulator 130 may receive an optical input signal and divide the signal into two components—an I component which may be referred to as the "in phase" component of the signal, and a Q component which may be referred to as the quadrature component of the signal. The Q component of the signal may experience a ninety-degree phase shift from the I component of the signal. The DAC 110 may receive a N-bit (where N is an integer and N>0) digital electrical signal from an ASIC, and convert the N-bit digital electrical signal to a corresponding analog signal. The corresponding analog signal may then be transmitted through the linear RF driver 120 to increase the signal's output power to a level sufficient for powering the I/Q modulator 130 and achieving a reasonable power level for the optical output signal. Each of the DACs 110 and the linear RF drivers 120 may have a relatively high power dissipation, e.g. about 6 Watts (W) for four 40 nanometer (nm) process complimentary metal-oxide semiconductor (CMOS) DACs and about 5 W to about 8 W for a gallium arsenide (GaAs) based RF driver. The DACs 110 and linear RF drivers 120 may also occupy a large amount of the relatively limited space available on a die for integrated optical electronics circuits. Additionally, each DAC 110 may have a limited bandwidth of about 15-20 gigahertz (GHz) due to limitations in the 40 nm CMOS process used in their creation, thereby limiting the overall bandwidth of apparatus 100 to about 15-20 GHz. The high power consumption of the DACs 110 and linear RF drivers 120 may make high-density multi-channel integration difficult to achieve.

Figure 2:
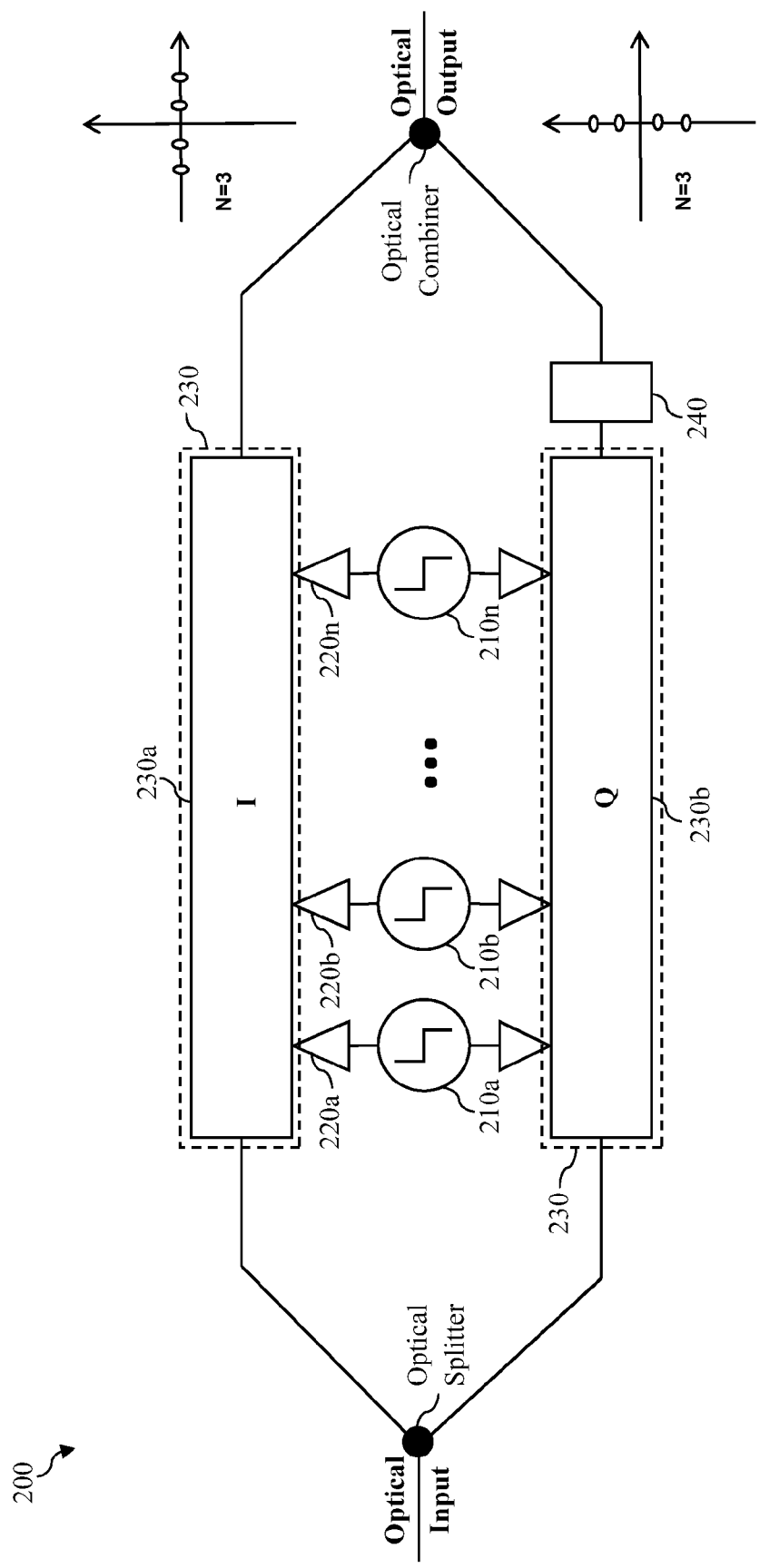
FIG. 2 is a schematic diagram of an embodiment of a digital optical transceiver that may be utilized for nQAM generation.

FIG. 2 is a schematic diagram of an embodiment of a digital optical transceiver 200 that may be utilized for nQAM generation. Transceiver 200 may comprise an optical signal input, an optical splitter, digital electrical signal inputs 210a-n, logical inverters 220a-n utilized as drivers, a segmented optical phase I/Q modulator 230 (comprising an I signal component modulation section 230a and a Q signal component modulation section 230b), a phase shifter 240, an optical combiner, and an optical signal output. The optical splitter and optical combiner may be inherent internal components of a segmented phase modulator and are illustrated for purposes of clarity. Transceiver 200 may further comprise two arms or segments, one for modulation section 230a and one for modulation section 230b. Each arm of transceiver 200 may comprise N sections, where N is an integer and may be limited by the digital electrical signal output resolution of an ASIC generating digital electrical signal inputs 210a-n. In some embodiments, a minimum number of sections N that may be necessary for nQAM generation may be determined according to the equation: $N=(n^{0.5})-1$. Each section may comprise a digital electrical signal input 210 coupled to one or more logical inverters 220, each of which is in turn coupled to its respective modulation section 230a or 230b. The optical signal input may be divided into its respective I and Q signal components upon entering transceiver 200 by the optical splitter, after which the I and Q signal components may be transmitted to the corresponding modulation sections 230a and 230b. Digital electrical signal inputs 210a-n may be digital electrical signals that may be utilized to drive modulator 230. Digital electrical signal inputs 210a-n may further be differential signals that have a value of about +1 on a first side and a value of about −1 on a second side. Digital electrical signal inputs 210a-n may be transmitted to logical inverters 220a-n to increase the power level of the signals prior to transmitting the signals to the modulator 230. Phase shifter 240 may be coupled to the output of modulation section 230b and may shift the phase of the output signal from modulation section 230b by 90 degrees. The optical combiner may combine the output signal from phase shifter 240 with the output signal from modulation section 230a to form the optical signal output.

Each arm of transceiver 200 may include isolation sections located between each active section to reduce crosstalk between the sections and improve overall performance. Additionally, the insertion loss, length of each section, and Vπ may be optimized to facilitate the best possible bandwidth output power. For example, for a transceiver with about 10 sections, each having a length of about 0.5 millimeters (mm), the total active length may be about 5 mm. For an insertion loss of about 1 decibel (dB)/mm, Vπ*L=1 volt (V)*centimeter (cm), and a fixed driver output of about 1 volt peak-to-peak (Vpp), the total insertion loss of the active region may be about 5 dB, Vπ=2V, and the modulation loss caused by under-modulating may be about 3 dB. For this example, the total loss with modulation may be about 8 dB (not including multi-mode interface (MMI)). The logical inverters 220a-n utilized as digital drivers may consume very little power. This may be because the logical inverters 220a-n may work in an on or off state without varying degrees, and, ideally, may have no current flowing through it. For example, an array of eight 40 nm CMOS inverters, at Vpp equal to about 1 V, may consume about 100 milli-watts (mW) power. A dual-polarization (DP) nQAM transceiver utilizing a four-driver array may consumer about 400 mW of power, which may be a significant reduction in power consumption compared to that of apparatus 100. In a transceiver such as transceiver 200, the significant reduction in power consumption compared to apparatus 100 may be realized through the elimination of DACs and linear drivers. Additionally, the elimination of DACs may increase the bandwidth of a transceiver such as transceiver 200 to a value limited only by each individual section of the modulator rather than the total collective bandwidth of the modulator itself, or of the DACs. As such, transceiver 200 may not employ DACs or linear drivers in its modulation an optical signal.

Alternate embodiments of transceiver 200 may be formed by grouping nearby sections together and driving them simultaneously from the ASIC, thereby programming transceiver 200 to generate varying nQAM signals. For example, in a transceiver 200 utilizing seven sections, an alternative embodiment may be formed by grouping two consecutive sets of three sections together to facilitate the generation of a 16 QAM quadrature phase shifted keying (QPSK) signal. The remaining section may be disabled, may be used as an extra bit for equalization, or may be used in another manner dictated by design choice. Using this technique of grouping various combinations of sections, embodiments of transceiver 200 may be formed that may be capable of generating a plurality of signals, e.g. NRZ and/or nQAM, with the same hardware.

Figure 3:
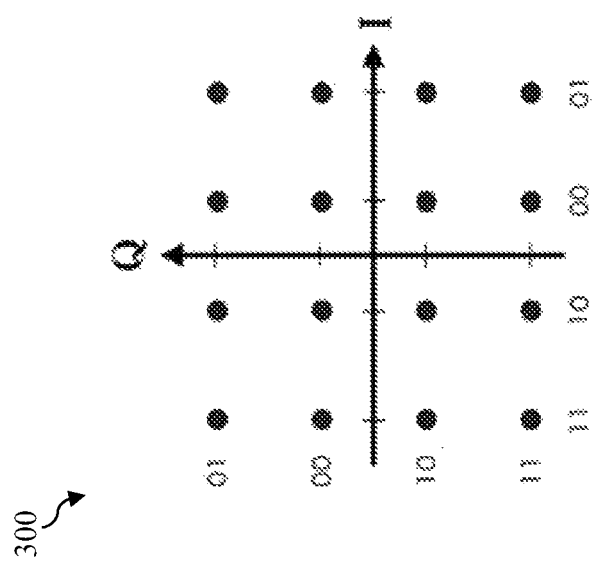
FIG. 3 is a graph of a 16 QAM signal constellation according to an embodiment of this disclosure.

FIG. 3 is a graph 300 of a 16 QAM signal constellation according to an embodiment of this disclosure. A 16 QAM signal may be generated by a transceiver, such as transceiver 200 shown in FIG. 2, by using about three equal sections according to the equation: $3=(16^{0.5})-1$. For each section biased at null, about four output amplitudes and about two phases, e.g. 0 or $\pi$, may be generated. The output amplitudes may then be combined by an optical combiner to generate the complete 16 QAM signal. Signals with varying levels of modulation may be generated according to embodiments of this disclosure, e.g. 64 QAM signal and 16 QAM signal.

Figure 4:
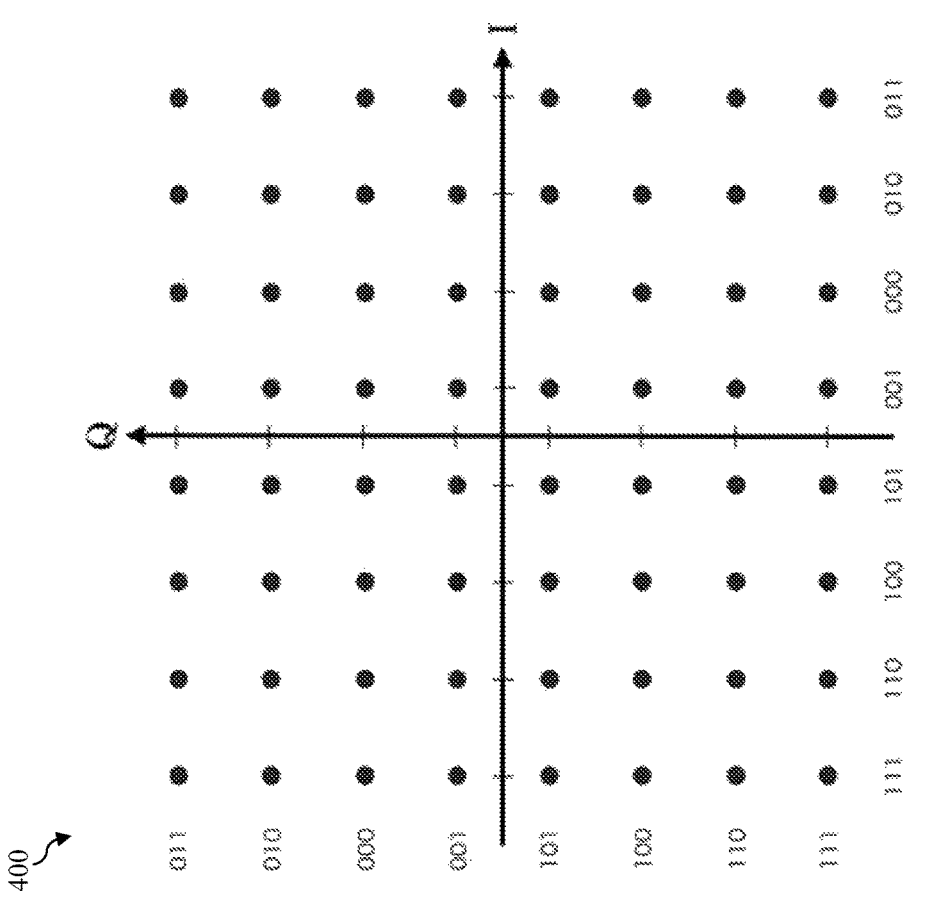
FIG. 4 is a graph of a 64 QAM signal constellation according to an embodiment of this disclosure.

FIG. 4 is a graph 400 of a 64 QAM signal constellation according to an embodiment of this disclosure. FIG. 4 may be generated substantially similar to FIG. 3, however FIG. 4 may use a greater number of sections N. Accordingly, higher levels of modulation, e.g. higher order nQAM signals, may be achieved by adding more sections N to each arm of a transceiver, such as transceiver 200 shown in FIG. 2. For example, using seven equal sections may enable a transceiver to generate a 64 QAM signal according to the equation: $7=(64^{0.5})-1$.

Figure 5:
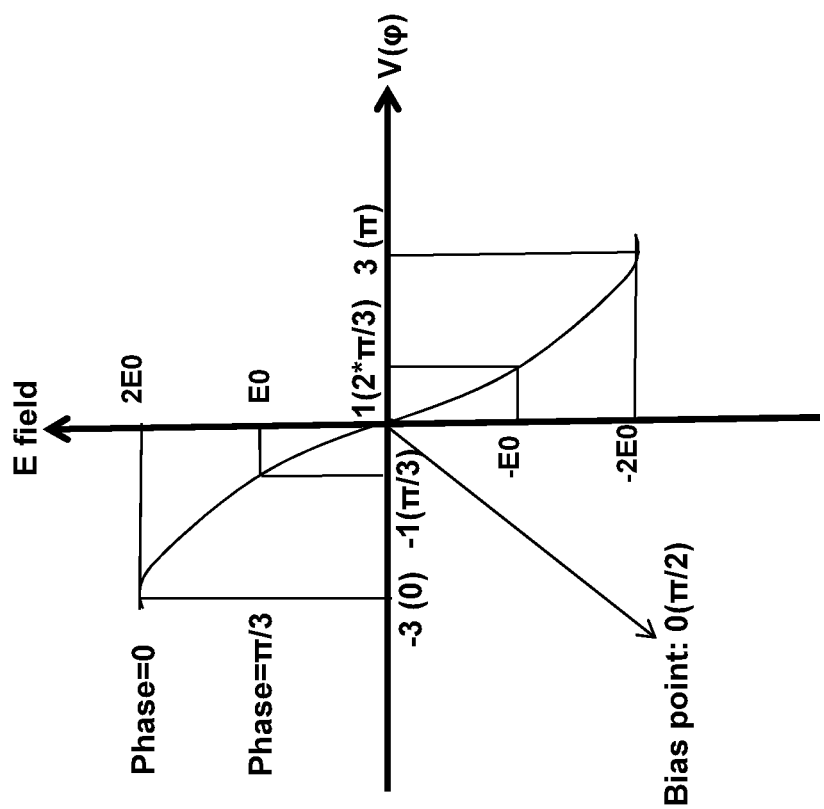
FIG. 5 is a graphical representation of an embodiment of 16 QAM generation in one arm of a transceiver using three modulation sections.

FIG. 5 is a graphical representation of an embodiment of 16 QAM generation in one arm of a transceiver using three modulation sections. Varying a value of a digital electrical signal, e.g. signal input 210a-n, being sent to the drivers for driving the modulator may vary a phase of the resulting modulated optical signal. The electrical field amplitude (E) is: $E=2E0*\cos(\varphi)$. The phase of the electrical field is determined based on the phase of the modulated signal according to the equation: 0 if $\varphi<0$ and $\pi$ if $\varphi>0$, where $\varphi$ is the phase of the modulated signal. The signal from one arm of a transceiver, e.g. an I signal component arm, as shown in FIG. 5 may then be combined with a corresponding signal from another arm of the transceiver, e.g. a Q signal component arm, to form a complete optical signal that may be transmitted to another device.

FIG. 6 is a table presenting electrical field values for 16 QAM generation using three equal sections according to an embodiment of this disclosure. FIG. 6 may be generated substantially similar to FIG. 5. When digital electrical signal inputs received from a digital signal processor and/or ASIC, such as digital electrical signal inputs 210a-n are varied, a resulting electrical field and its associated phase may be determined according to the equations discussed above with respect to FIG. 5. For example, in an embodiment of a modulation scheme wherein a first digital electrical signal D0 is set to −1, a second digital electrical signal is set to −1, and a third digital electrical signal is set to −1, the modulator may have a state of −3 and produce an electrical field with a value of about 2 and a phase of about 0, as is shown in FIG. 6. In an alternative embodiment wherein the first and second digital electrical signals remain the same but the third digital electrical signal is set to 1, the modulator may have a state of −1 and produce an electrical field with a value of about 1 and a phase of about $\pi/3$. A non-inclusive sampling of other possible modulation schemes and related values is shown more fully in FIG. 5.

Figure 7:
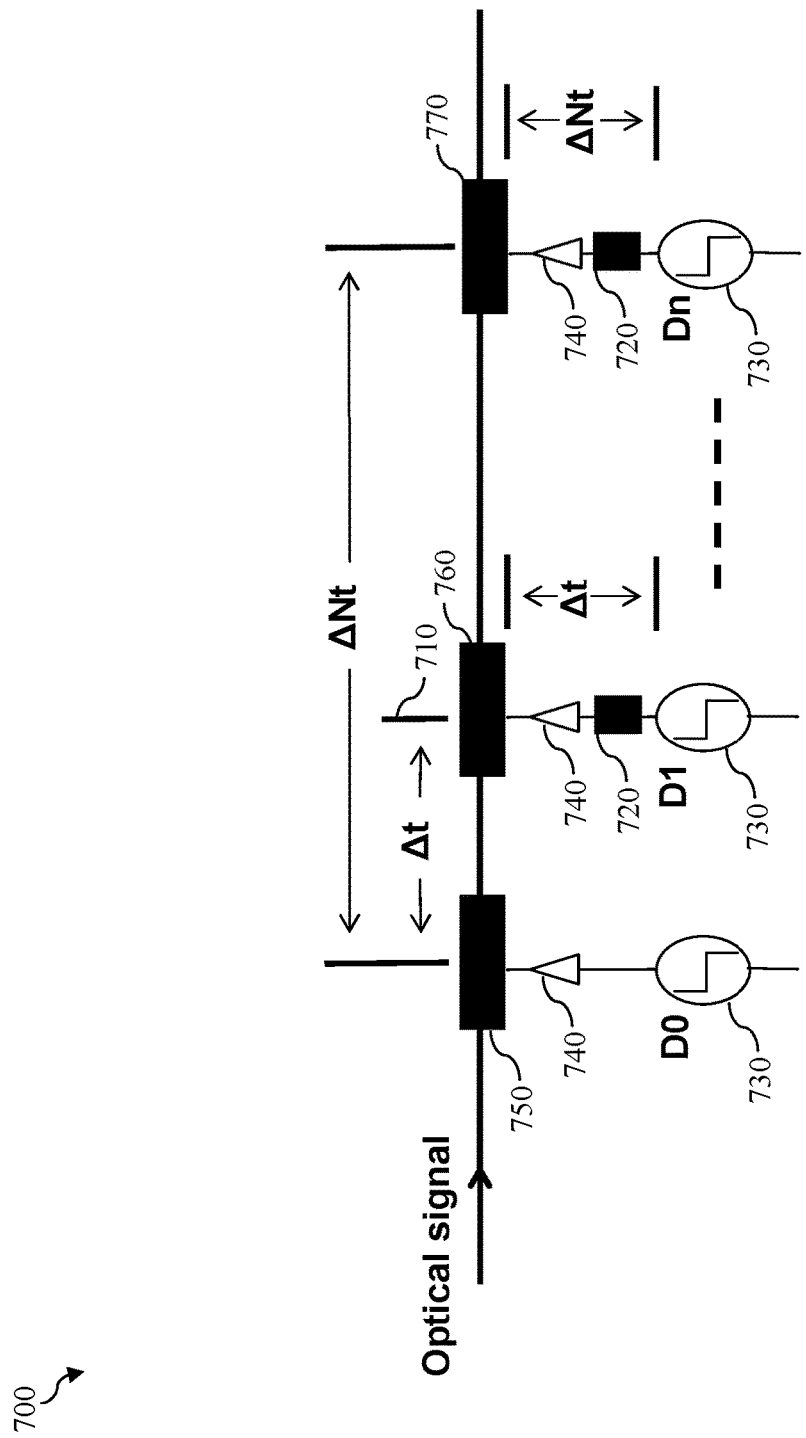
FIG. 7 is a schematic diagram illustrating delay in an embodiment of a transceiver that may be utilized for nQAM generation.

FIG. 7 is a schematic diagram 700 illustrating delay in an embodiment of a transceiver that may be utilized for nQAM generation. The delay between optical and electrical signals in a transceiver, such as transceiver 200, may be controlled digitally or by design. An optical delay 710 may exist between a first section 750 and a second section 760 of each arm of a transceiver and have a value of $\Delta t$. Accordingly, an optical delay between the first section 750 of each arm of the transceiver and the nth section 770 may have a value of $\Delta Nt$. A corresponding electrical delay 720 may be introduced between the digital electrical signal input 730 and logical inverter 740 in each section. The electrical delay 720 may correspond to the value of the optical delay at that respective section. The electrical delay 720 may be introduced so that the digital electrical signal input 730 may be in phase with the optical signal.

FIG. 8 is a table presenting electrical field values for an embodiment of a transceiver that may be utilized for nQAM generation. The labels of FIG. 8 may be substantially similar to the labels of FIG. 6. An alternative embodiment of a transceiver for 16 QAM generation may be formed by using four equal sections in each arm of the transceiver rather than the minimum number of three sections. However, as shown in FIG. 8, the use of four equal sections may lead to a change in the electrical field produced by the transceiver and the electrical field not being equally spaced. An unequally spaced electrical field may lead to the transceiver's constellation being distorted. To rectify and equalize the spacing, an embodiment of a transceiver with varying segment lengths or biasing at a non-null point may be employed.

Figure 9:
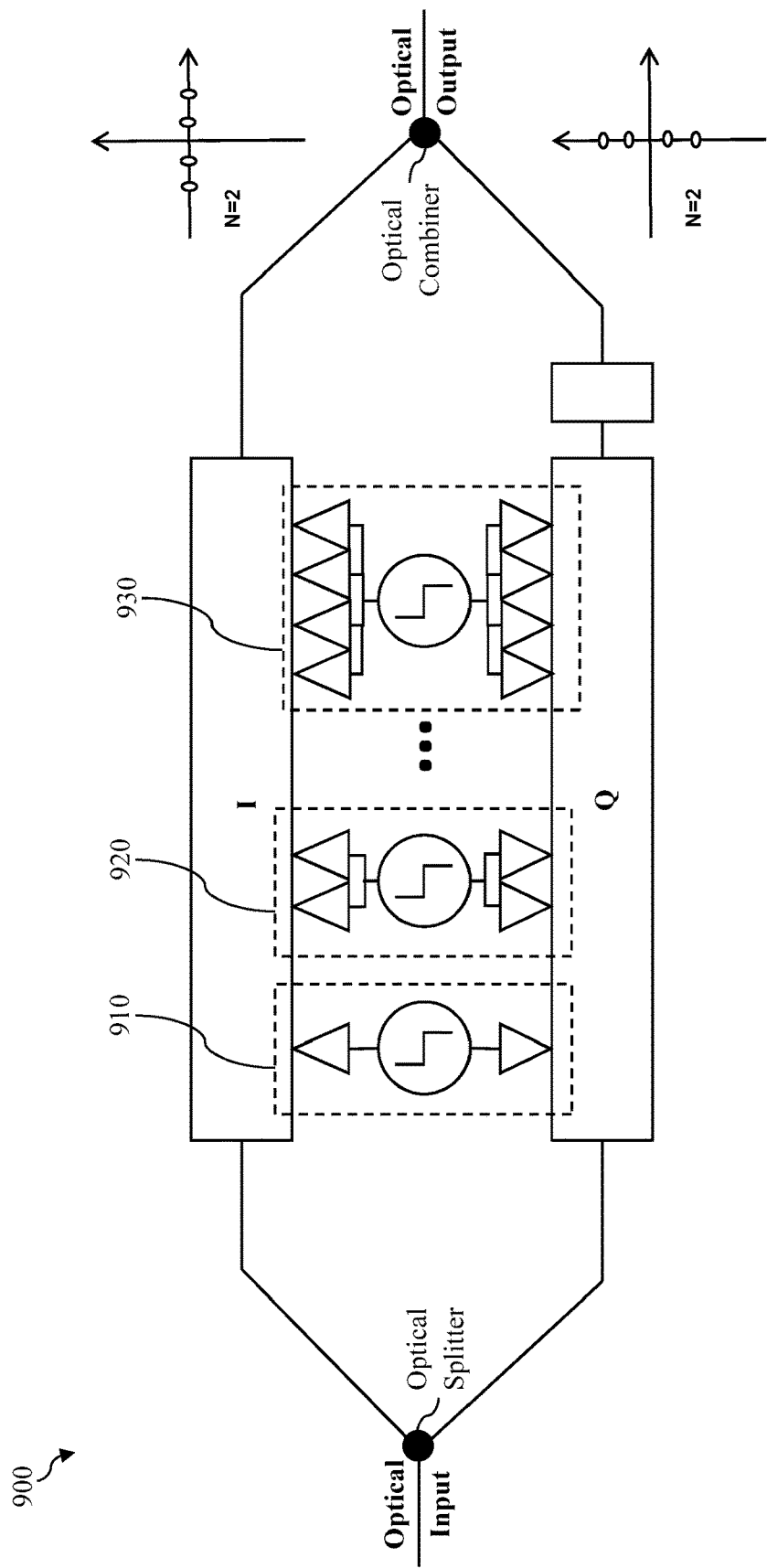
FIG. 9 is a schematic diagram of an embodiment of a digital optical transceiver that may be utilized for nQAM generation.

FIG. 9 is a schematic diagram of an alternative embodiment of a digital optical transceiver 900 that may be utilized for nQAM generation. Transceiver 900 may be substantially similar to transceiver 200; however, transceiver 900 may employ unequal section lengths in each arm of the transceiver 900. In other words, each section of transceiver 900 may contain a different number of drivers. For example, if a length of a first section 910 in transceiver 900 is L, the second section 920 may be about 2*L employing two logical inverters as drivers having the same input, the third section (not shown) about 3*L using three logical inverters as drivers having the same input, and the Nth section 930 about N*L using N logical inverters as drivers having the same input. Employing a number of logical inverters about equal to the number of that respective section, e.g. one inverter for first section, two inverters for second section, . . . , N inverters for Nth section, may maintain an about equal bandwidth for each section. In an embodiment of transceiver 900, a 16 QAM signal may be generated using about two sections in each arm of the transceiver rather than three sections as required by transceiver 200 shown in FIG. 2. Generally, the structure of transceiver 900 may enable it to generate about $2^N$ amplitudes of a signal in both the I and Q modulation sections, thereby generating an about $(2^N)^2$ QAM signal.

FIG. 10 is a table presenting electrical field values for 16 QAM generation using two unequal sections according to an embodiment of this disclosure. The labels of FIG. 10 may be substantially similar to the labels of both FIG. 6 and FIG. 8. The values of FIG. 10 may correspond to a hardware structure substantially similar to that of FIG. 9. As can be seen from FIG. 10, using unequal section lengths may allow transceiver 900 to generate an equivalent nQAM signal using fewer sections than transceiver 200 shown in FIG. 2.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    an optical signal input;
    a plurality of digital drivers configured to receive a plurality of digital electrical signal inputs from a digital electrical signal processor; and
    a modulator coupled to the optical signal input and configured to generate a quadrature amplitude modulated signal, the modulator comprising:
        a first segment; and
        a second segment, the first segment and the second segment of the modulator each comprising a plurality of sections, each of the plurality of sections of the first segment and the second segment being coupled to one of the plurality of digital drivers, each of the plurality of sections of the first segment and the second segment of the modulator being configured to receive one of the plurality of digital electrical signal inputs from the digital electrical signal processor via the plurality of digital drivers without using a digital-to-analog converter,
    an electrical delay being applied to at least one of the plurality of digital electrical signal inputs received by at least one of the plurality of sections, the electrical delay corresponding to an optical delay present at the at least one of the plurality of sections.

2. The apparatus of claim 1, wherein each of the plurality of digital drivers comprises a logical inverter.

3. The apparatus of claim 1, wherein the plurality of digital drivers comprises a plurality of logical inverters arranged in parallel with each other.

4. The apparatus of claim 3, wherein the apparatus does not comprises a linear radio frequency (RF) driver positioned between the plurality of digital electrical signal inputs and the modulator.

5. The apparatus of claim 3, further comprising:
    an optical splitter positioned between the optical signal input and the modulator that splits the optical signal into an I component and a Q component; and
    an optical combiner positioned between the modulator and an optical signal output that combines the I component and the Q component.

6. The apparatus of claim 1, wherein the first segment and the second segment of the modulator are coupled in parallel, and wherein a phase shifter is coupled between the second segment and an optical combiner.

7. The apparatus of claim 6, wherein the electrical delay is applied to the at least one of the plurality of digital electrical signal inputs before the at least one of the plurality of digital electrical signal inputs is received by at least one of the plurality of digital drivers.

8. The apparatus of claim 7, wherein the apparatus is part of an optical transceiver.

9. An optical transceiver comprising:
    an optical signal input;
    a first modulation segment coupled to the optical signal input;
    a second modulation segment coupled to the optical signal input and positioned in parallel with the first modulation segment,
    the first modulation segment comprising:
        a first digital driver; and
        a first modulator section coupled to the first digital driver and configured to receive a first digital electrical signal input via the first digital driver, and
    the second modulation segment comprising:
        a second digital driver; and
        a second modulator section coupled to the second digital driver and configured to receive a second digital electrical signal input via the second digital driver; and the first modulation segment and the second modulation segment
    being configured to generate a quadrature amplitude modulated signal, and
    an electrical delay being applied the second digital electrical signal input received by the second modulator section, the electrical delay corresponding to an optical delay present at the second modulator section.

10. The optical transceiver of claim 9, wherein the first digital driver comprises a first digital logic inverter coupled to the first digital electrical signal input and the first modulation segment, and wherein the second digital driver comprises a second digital logic inverter coupled to the second digital electrical signal input and the second modulation segment.

11. The optical transceiver of claim 10, wherein the first digital electrical signal input is transmitted from a digital electrical signal processor to the first digital logic inverter without using a digital-to-analog converter, and wherein the second digital electrical signal input is transmitted from the digital electrical signal processor to the second digital logic inverter without using a digital-to-analog converter.

12. The optical transceiver of claim 10, wherein a linear radio frequency (RF) driver is not used as the first digital driver or the second digital driver.

13. The optical transceiver of claim 9, wherein the first modulation segment further comprises:
  a third digital electrical signal input; and
  a third digital driver coupled to the third digital electrical signal input and the first modulation segment, wherein the third digital driver comprises a plurality of digital logic inverters, and
wherein the second modulation segment further comprises:
  a fourth digital electrical signal input; and
  a fourth digital driver coupled to the fourth digital electrical signal input and the second modulation segment, wherein the fourth digital driver comprises a plurality of digital logic inverters.

14. The optical transceiver of claim 9, wherein a bandwidth of the optical transceiver is limited by a bandwidth of each respective modulator driver section and not by an overall modulator value.

15. The optical transceiver of claim 9, wherein the optical signal input and each digital electrical signal input have a matched phase.

16. The optical transceiver of claim 9, wherein a phase shifter is coupled between the second modulation segment output and an optical signal output.

17. The optical transceiver of claim 9, wherein the first modulation segment and the second modulation segment comprise a segmented optical phase modulator.

18. A method comprising:
  receiving, by a modulator comprising a first segment and a second segment, an optical signal, the first segment and the second segment of the modulator each comprising a plurality of sections, each of the plurality of sections of the first segment and the second segment being coupled to one of a plurality of digital drivers;
  applying, by the modulator, an electrical delay to at least one of a plurality of digital electrical signal inputs received by at least one of the plurality of sections from a digital electrical signal processor, the electrical delay corresponding to an optical delay present at the at least one of the plurality of sections; and
  modulating, by the plurality of sections of the first segment and the second segment, the optical signal using the plurality of digital electrical signal inputs to generate a quadrature amplitude modulated signal, wherein a digital electrical signal input is not converted to an analog signal prior to being used to modulate the optical signal.

19. The method of claim 18, wherein a speed of which the optical signal is modulated is limited by a bandwidth of the modulator.

20. The method of claim 18, wherein the digital electrical signal and a digital logic inverter comprise a driver used to modulate the optical signal.

* * * * *